(12) United States Patent  
Nogami (10) Patent No.: US 6,285,988 B1  
(45) Date of Patent: Sep. 4, 2001

(54) AUTOMATED TELLER MACHINES

(75) Inventor: Masaru Nogami, Odawara (JP)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/220,756

(22) Filed: Mar. 31, 1994

(30) Foreign Application Priority Data

Mar. 31, 1993 (JP) .................................................. 5-095105

(51) Int. Cl.$^7$ .................................................. G06F 17/60
(52) U.S. Cl. .................................................. 705/35
(58) Field of Search ................................ 395/650; 364/479; 209/534; 235/379; 271/3, 3.18, 3.19, 3.2; 700/231; 705/35

(56) References Cited

U.S. PATENT DOCUMENTS 4,521,008 * 6/1985 Granzow et al. .................. 271/3

FOREIGN PATENT DOCUMENTS

| 0473374-A2 | * | 3/1992 | (EP) . | |
| 6210788 | * | 3/1987 | (JP) | G06F/15/30 |
| 0475165 | * | 6/1992 | (JP) | G06F/15/30 |
| 12-322623-A | * | 11/2000 | (JP) . | |

OTHER PUBLICATIONS

"Public sector banks and computerized braches"; Hindu, Sep. 30, 1998.*
Hotchkin: "De La Rue Cash Systems—maximizing the potential and efficiency or existing delivery channel—the BRANCH"; Michigan Banker, Jan. 100, vol. 13, No. 1, pp. 18–20.*
English translation of Japanese Document No. 04–75165.*
English Translation of abstract of Japanese Document No. 0475165.*
English Translation of Japanese Document 6210788.*

* cited by examiner

Primary Examiner—Edward R. Cosimano

(57) ABSTRACT

An automated teller machine having a plurality of independently operable customer operation stations, one or more cash handling mechanisms and a controller for controlling the operation of the customer operation stations and the cash handling mechanisms. The cash handling mechanisms are fewer in number than the customer operation stations, and are shared by the customer operation stations. If multiple customer operations stations try to concurrently access any one cash handling mechanism in a competing manner, the controller prioritizes the customer operation stations to minimize their idle time due to such an access conflict. Such a scheme enhances the operating efficiency of the cash handling mechanisms while keeping the overall cost of the automated teller machine per customer operation station relatively low.

1 Claim, 6 Drawing Sheets

AUTOMATED TELLER MACHINES

BACKGROUND OF THE INVENTION

The present invention relates generally to new and novel improvements in automated teller machines. More particularly, the present invention relates to automated teller machines which include two or more customer operation stations and one or more cash handling mechanisms, wherein the cash handling mechanisms are capable of servicing more than one of the customer operation stations.

Automated teller machines have been widely installed at financial institutions and other locations. Generally, automated teller machines are operated by customers for withdrawing currency from and depositing currency and other negotiable documents into various customer accounts. As a possible alternative, automated teller machines can be set up to permit customers to only withdraw currency, and not make deposits.

Conventional automated teller machines generally include a single customer operation station and a corresponding single cash handling mechanism. When customers are operating such automated teller machines, the entire automated teller machine, including the customer operation station, as well as the corresponding cash handling mechanism, is monopolized by the customer, regardless of the operational status of the customer operation station or the cash handling mechanism.

Some automated teller machines, for example the one disclosed in Japanese Patent Laid-Open No. SHO/62-10788, include a cash dispensing mechanism and a plurality of cash output ports arranged in parallel. In this type of automated teller machine, the currency dispensed by the cash handling mechanism is delivered selectively to one of the cash output ports. However, there is no further information disclosed in this reference as to whether or not requests to the cash output ports may be made concurrently, and if concurrent requests are possible, as to how the automated teller machine operates in response to such concurrently made requests.

Generally, an automated teller machine operates in three stages: (1) the machine magnetically reads data from an account identification card inserted by the customer and receives and verifies the customer's personal identification code and the amount of the requested withdrawal or deposit; (2) the machine gains access to a central computer to ascertain the customer's bank account and its balance; and (3) the machine dispenses or accepts currency for withdrawal or for deposit. The time required to complete step (1) varies appreciably depending on the customer's familiarity with and skills in performing the operations at the customer operation station. Step (1) normally takes a substantial portion of the total duration of time which the automated teller machine requires to complete a single transaction.

In many conventional automated teller machines, the cash handling mechanism is relatively bulky and takes up a large amount of space. In addition, the cash handling mechanism normally constitutes a significant portion of the total cost of the automated teller machine.

However, the cash handling mechanism of a conventional automated teller machine which may include a currency storage portion, a currency counting portion and a currency transport portion, does not operate at all during automated teller machine operation steps (1) and (2). This is a factor contributing to the failure in lowering the cost performance of automated teller machines per customer operation station and in hampering efforts at downsizing automated teller machines.

One solution to this problem is to furnish a plurality of cash handling mechanisms and/or to have the cash handling mechanisms shared by a plurality of customer operation stations. However, this solution entails other disadvantages, one of them being that the congestion due to multiple customers concurrently accessing the currency handling mechanism may cause the processing of some operations to be suspended temporarily. Another disadvantage is that as the number of times currency is withdrawn from a cash handling mechanism increases, that particular cash handling mechanism requires currency replenishing more frequently.

A conventional cash management system including a plurality of automated teller machines does exist where the cash management system supplies cash to any of the automated teller machines exhausted of currency and collects currency from any automated teller machine when it is filled with deposited currency above a predetermined level. However, this cash management system differs from the present invention in that the latter is intended to operate the cash handling modules of each automated teller machine efficiently, while the conventional cash management system aims at integrated control over multiple automated teller machines having one cash handling mechanism each.

SUMMARY OF THE INVENTION

Accordingly, an object of the present invention is to provide automated teller machines which utilize their cash handling mechanisms with improved operating efficiency such that the cost performance of the automated teller machine per transaction is enhanced.

Another object of the present invention is to provide automated teller machines capable of letting the number of customer operation stations and that of cash handling mechanisms be varied when configured, the proportion of customer operation stations and cash handling mechanisms being varied as needed to optimize the operating characteristics of the automated teller machine in its particular installed location and operating environment.

Yet another object of the present invention is to provide automated teller machines which are capable of operating with one functional cash handling mechanism when a second installed cash handling mechanism is inoperable for uninterrupted currency handling operations.

These and other objects of the present invention are attained by the provision of automated teller machines for dispensing currency in response to customers' requests including two or more customer operation stations which operate independently of each other, one or more cash handling mechanisms, the number of cash handling mechanisms being less than the number of customer operation stations. Each of the cash handling mechanisms preferably include a currency storage portion, a currency counting portion and a currency transport portion. The currency counting portion withdraws a requested amount of currency from the currency storage portion and counts the withdrawn currency. The currency transport portion transports the counted currency to a cash output port of a selected customer operation station. The automated teller machine also includes a controller for judging which of the withdrawal requests made concurrently in a competing manner by customers to a single cash handling mechanism should take priority over the others and for allowing the cash handling mechanism to respond to the selected request accordingly.

According to another aspect of the present invention, there is provided automated teller machines for paying currency and accepting deposits in response to customers' requests including two or more customer operation stations operable independently of one another, one or more cash handling mechanisms, the number of cash handling mechanisms being fewer in number than the number of customer operation mechanism. Each of the cash handling mechanisms preferably includes a currency storage portion, a cash counting portion, a currency transport portion and a currency recycling portion. The currency counting portion withdraws a requested amount of currency from the currency storage portion and counts the withdraw n currency. The currency transport portion transports the counted currency to a currency output port of a selected customer operation station. The currency recycling portion recycles deposited currency to the currency storage portion and a controller judges which of the withdrawal and deposit requests made concurrently in a competing manner by customers to a single currency handling mechanism should take priority over the others and for allowing the cash handling mechanism to respond to the selected request accordingly.

With the automate d teller machine according to the present invention, the simultaneously operable two or more customer operation stations share the one or more cash handling mechanisms. This enhances the operating efficiency of the cash handling mechanisms. If the customer operation stations are operated simultaneously, the controller tells the cash handling mechanisms to dispense currency to the customer operation mechanisms according to a predetermined order of priority, or by deciding the current order of priority for the customer operation mechanisms. However, it is somewhat rare for the cash handling mechanisms to exactly overlap in operation timing even when customers operate the customer operation stations in an apparently simultaneous manner. This is because the speed of operating the customer operation station keys varies considerably from customer to customer. Therefor, in practical terms, there is little delay caused by overlapping requests from multiple customer operation stations to a single cash handling mechanisms for the handling of currency.

In the situation where a plurality of customer operation stations make requests for withdrawal or other transactions simultaneously to the same cash handling mechanism, the controller controls the cash handling mechanism so it operates efficiently and the time required of any customer to wait for his or her transaction to complete will be minimized. According to one aspect of the present invention, the customer operation stations and the cash handling mechanisms are configured as independently operable and connectable units which may be combined so as to optimize the load on the cash handling mechanisms under the current automated teller machine operating circumstances.

In accordance with one aspect of the automatic teller machine in accordance with the present invention having currency withdrawal and depositing functions, deposited cash is recycled to the cash handling mechanisms for subsequent withdrawal. Unlike automated teller machines which only dispense previously stocked currency, this recycling arrangement reduces the number of times the cash handling mechanism of an automated teller machine needs to be replenished with currency.

Other objects, advantages and novel features of the present invention will become apparent in the following detailed description of the invention when considered in conjunction with the accompanying drawings.

DETAILED DESCRIPTION OF THE DRAWINGS

Figure 1:
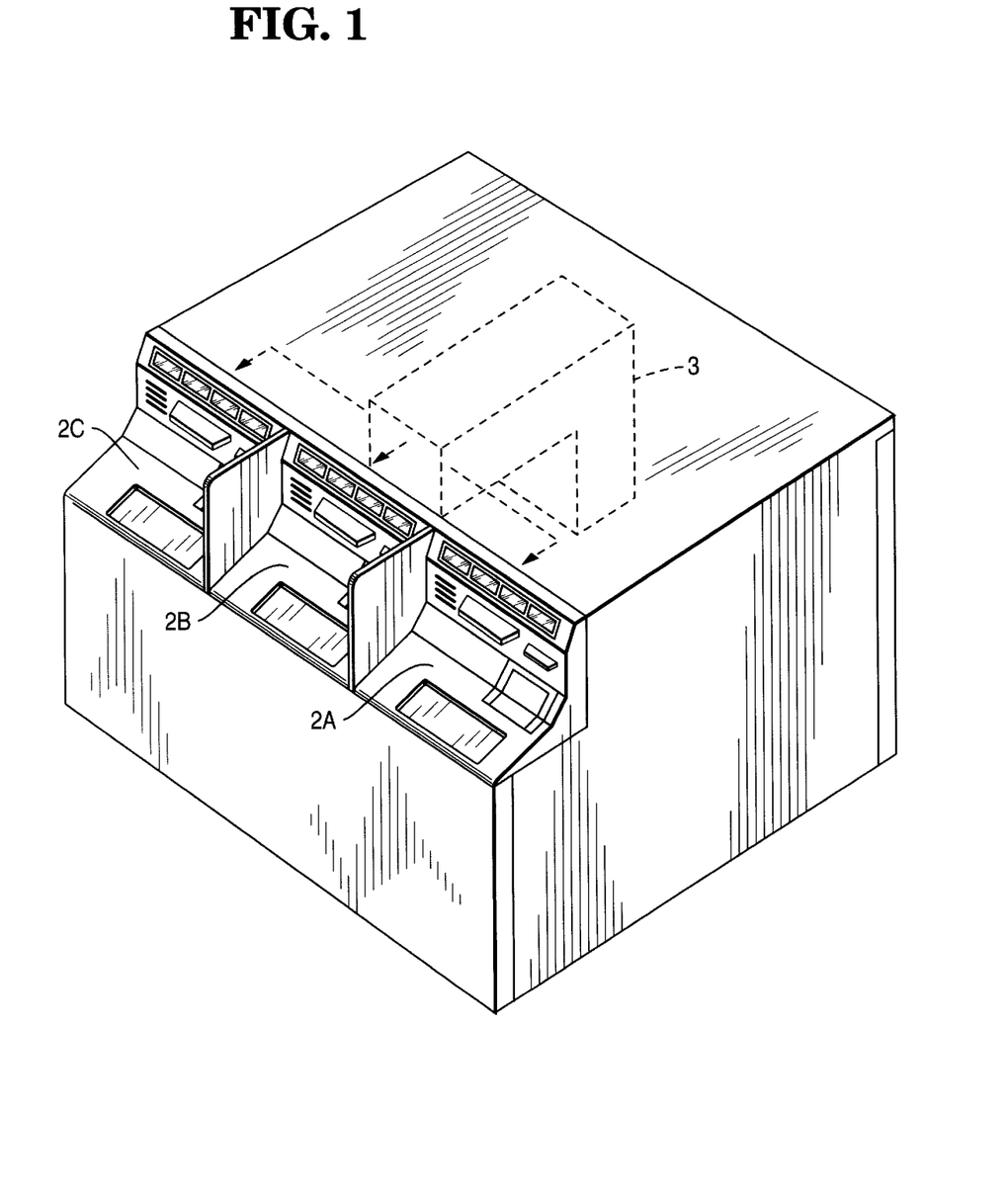
FIG. 1 illustrates a schematic view of a preferred embodiment of an automated teller machine in accordance with the present invention, the automated teller machine having three customer operation stations and one cash handling mechanism.
Figure 2:
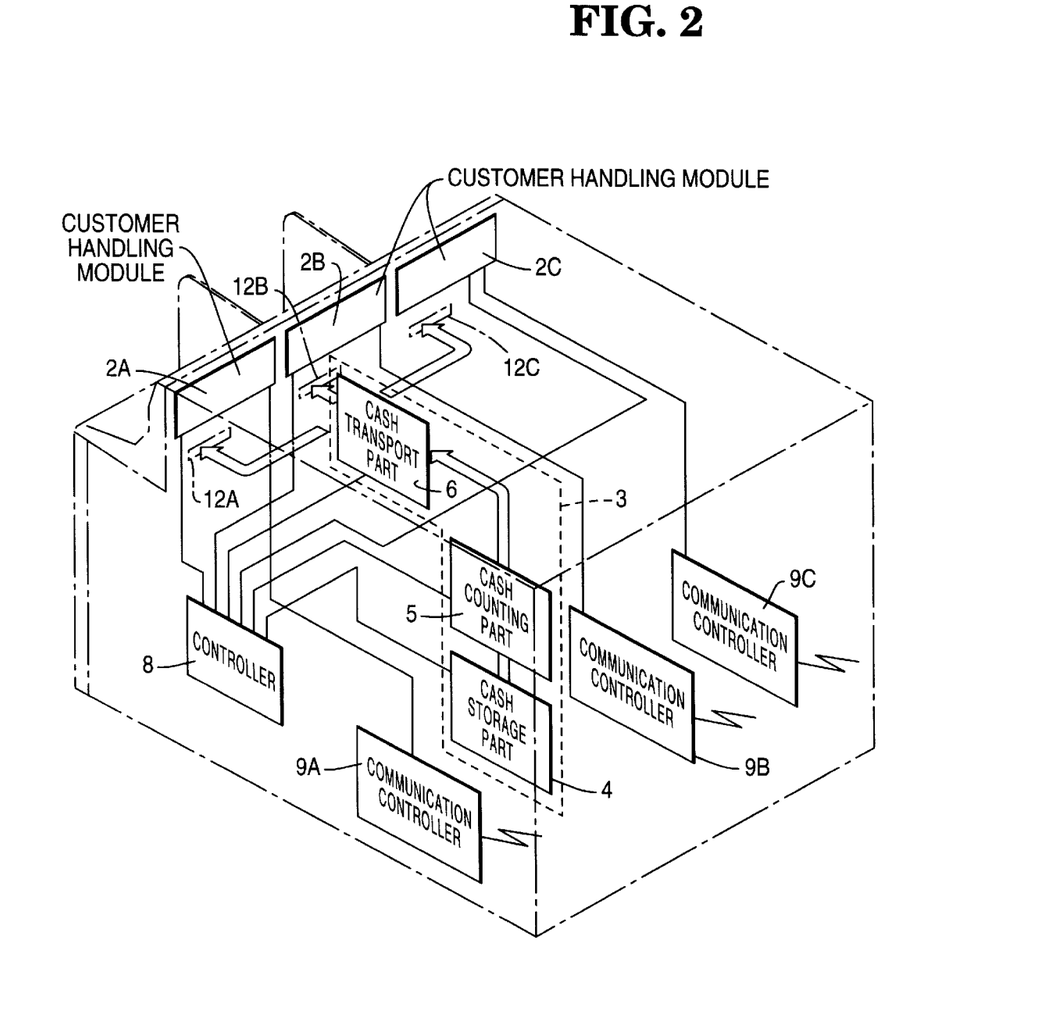
FIG. 2 is a functional block diagram of the preferred embodiment of an automated teller machine shown in FIG. 1.

Referring now to the drawings, in which like-referenced characters indicate corresponding elements throughout the several views, attention is first drawn to FIG. 1 which is a schematic view of an automated teller machine in accordance with a preferred embodiment of the present invention. The automated teller machine generally includes three customer operation stations 2A, 2B and 2C and one cash handling mechanism 3. FIG. 2 is a functional block diagram depicting the basic arrangement of components forming this preferred embodiment of an automated teller machine in accordance with the present invention. As seen in FIG. 1, what characterizes this preferred embodiment is that one cash handling mechanism 3 services three customer operation modules 2A, 2B and 2C in dispensing currency thereto or accepting deposits therefrom. As seen in FIG. 2, cash handling mechanism 3 includes currency storage portion 4, currency counting portion 5 and currency transport portion 6.

Referring now to FIG. 2, the following is a description of the basic arrangement of this preferred embodiment of an automated teller machine in accordance with the present invention. Customer operation stations 2A, 2B and 2C are capable of being operated independently of one another, i.e., they may be simultaneously operated independently by three customers. Each customer operation station generally includes a data input portion, a card reader, a printer, a display, a cash output port and a cash input port, none of which are shown. Cash handling mechanism 3 includes currency storage portion 4 which stores bills of various denominations, currency counting portion 5 which counts and retrieves currency from currency storage portion 4, the amount of currency retrieved being the amount of currency requested from the customer operation station, and cash transport portion 6, which transports the counted currency from currency counting portion 5 to the appropriate cash output port. Cash transport portion 6 includes a transport path. Cash sorter 7 sorts the currency sent from the currency counting portion 5 for delivery through the transport path to any of the cash output ports of customer operation modules 2A, 2B or 2C.

Controller 8 controls the operation of cash handling mechanism 3 in response to currency handling requests from customer operation stations 2A, 2B and 2C. Communication controllers 9A, 9B and 9C are provided to correspond with customer operation stations 2A, 2B and 2C. Communication controllers 9A, 9B and 9C control communications with a branch controller which manages the customer account files or with a central computer for verifying or updating the customer account files residing therein.

As an example, suppose that, in operation, three customers operate the three customer operation stations 2A, 2B and 2C to withdraw currency and their input operations terminate successively at the customer operation stations 2A 2B and 2C in that order. When the input operation terminates at customer operation station 2A, communication controller 9A starts operating to verify the customer's account file and the amount of currency withdrawal requested. At the same time, the currency withdrawal request is forwarded to controller 8. In turn, cash handling mechanism 3 starts handling currency under control of controller 8. When the input operation at customer operation station 2B terminates during handling of currency for customer operation station 2A, communication controller 9B starts operating to verify the customer's account file, as in the case of customer operation station 2A. Because cash handling mechanism 3 is still working for customer operation station 2A at that time, customer operation station 2B is given the priority next to that of customer operation station 2A and waits for its currency handling request to be honored. When the input operation at customer operation station 2C terminates in that state, customer operation station 2C is given the priority next to that of customer operation station 2B and waits for its currency handling request to be honored.

When the handling of currency for customer operation station 2A terminates, the currency handling request of customer operation station 2B is serviced as prioritized, followed by the request of customer operation station 2C. In one preferred embodiment of the present invention, when a customer makes a currency withdrawal request at customer operation station 2A, communication controller 9a counts and retrieves currency as requested by the customer file before the customer account file is verified. After verification by communication controller 9A, the requested amount of withdrawal may turn out to exceed the balance of the customer's account. In that case, the currency counted and retrieved from the currency storage portion is returned thereto.

In the example above, it is assumed that the customers' inputs through the three customer operation stations 2A, 2B and 2C terminate approximately at the same time so that the operations required for cash handling overlap in time for the three customer operation stations 2A, 2B and 2C. However, even if the three customers start operating their respective customer operation stations simultaneously, it is unlikely that the currency handling requests from the three customer operation stations would overlap in time. This is due to the difference in operating speed from one customer to another. There are almost always occur temporal discrepancies between the customers' operations. The operating efficiency of cash handling mechanism 3 is enhanced by taking advantage of such discrepancies.

With the preferred embodiment of automated teller machine in accordance with the present invention described above, the operation of the communication controller and that of the cash handling mechanism are carried out in parallel so as to minimize the operation time taken per transaction and customer. However, this scheme is not limitative of the present invention. Alternatively, currency could be handled after verification of the customer account file by the communication controller. Although the alternative scheme requires longer operation time per transaction and customer where currency handling requests do not conflict with one another, it has the advantage of not having to return the counted currency to the currency storage portion in case the customer's account balance is found to insufficient. In addition, the processing speed does not change appreciably when currency handling requests do conflict.

The operation of the cash handling mechanism will now be described, with an emphasis on how the currency transport portion 6 thereof is arranged and how it operates. Currency storage portion 4 stores bills of various denominations. Currency counting portion 5 counts and retrieves currency from currency storage portion 4 as requested from the customer operation stations. The mechanisms for counting and retrieving currency from currency storage portion 4 are well known in the industry and will not be further described here. The currency counted by currency counting portion 5 is transported by currency transport portion 6 to the cash output port of the customer operation station that issued the currency withdrawal request.

Figure 3:
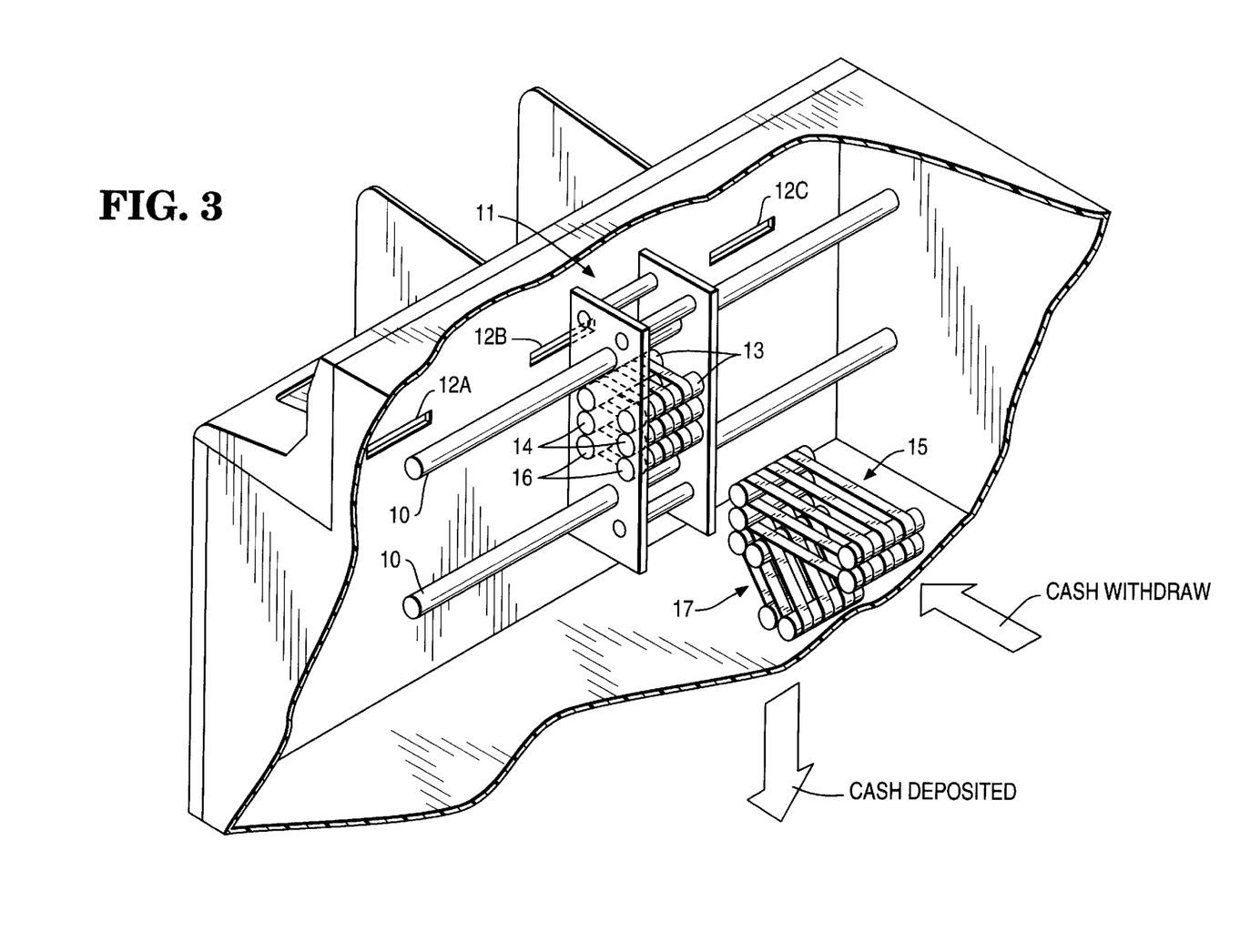
FIG. 3 is a perspective view of the currency transport portion of the preferred embodiment of an automated teller machine shown in FIG. 1, with portions of the automated teller machine being broken away for purposes of illustration.

FIG. 3 illustrates a currency transport portion in accordance with a preferred embodiment of the present invention for dealing illustratively with the three customer operation stations. The purpose of currency transport portion 6 is to transport to the requesting customers operation station the currency counted and retrieved from currency storage portion 4, under control of controller 8. Included in FIG. 3 is carriage type dispensing mechanism 11 that moves slidingly along guide shafts 10 to reach the front of the cash output port of each customer operation station. The carriage is driven, for example, by the combination of a belt or wire with a linear motor, not shown.

The currency taken from currency counting portion 5 is forwarded by transport roller 15 and is held pinched between rollers 13 and 14 at an upper stage of dispensing mechanism 11. While holding the currency, dispensing mechanism 11 is driven by a driver, not shown, to move slidingly along guide shafts 10 under the control of controller 8. Dispensing mechanism 11 thus moves until it reaches the cash output port 12A, 12B or 12C of the customer operation station that issued the currency withdrawal request. With dispensing mechanism 11 positioned at the appropriate cash output port 12A, 12B or 12C, a motor on the carriage, not shown, drives rollers 13 and 14 to deliver the currency to the appropriate cash output port 12A, 12B or 12C. Thereafter, a message is displayed and the shutter of cash output port 12A, 12B or 12C is opened according to standard operating procedures.

Although dispensing mechanism 11 shown in FIG. 3 is shown as being of a carriage type, this is not limitative of the present invention. There may be adopted alternative dispensing mechanisms, for example, gate mechanisms. The gate mechanism, contained in the transport path, may be controlled so that the currency from currency counting portion 5 is distributed directly to the appropriate cash output port 12A, 12B or 12C.

Although the preferred embodiment of an automated teller machine in accordance with the present invention described above has one cash handling mechanism furnished in conjunction with three customer operation stations, the number of cash handling mechanisms addressing customer operation stations can be varied in accordance with the operating environment in which the automated teller machine is installed. For example, furnishing one cash handling mechanism for, say, two customer operation stations reduces the possibility of the latter customer operation stations competing simultaneously for the service of the cash handling mechanism. However, with this configuration the operating efficiency of the automated teller machine is lowered correspondingly and the overall cost of the automated teller machine per customer operation station is increased. Accordingly, it is generally desireable to optimize the number of customer operation stations in conjunction with the number of cash handling mechanisms for given operating circumstances.

For example, if the automated teller machine is to be set up where it is used frequently, three customer operation stations may be addressed by, say, two cash handling mechanisms. With such a configuration, there is little possibility of the conflict of access to the cash handling mechanisms from the customer operation stations despite the fact that this automated teller machine has one cash handling mechanism less than conventional automated teller machines.

Figure 4:
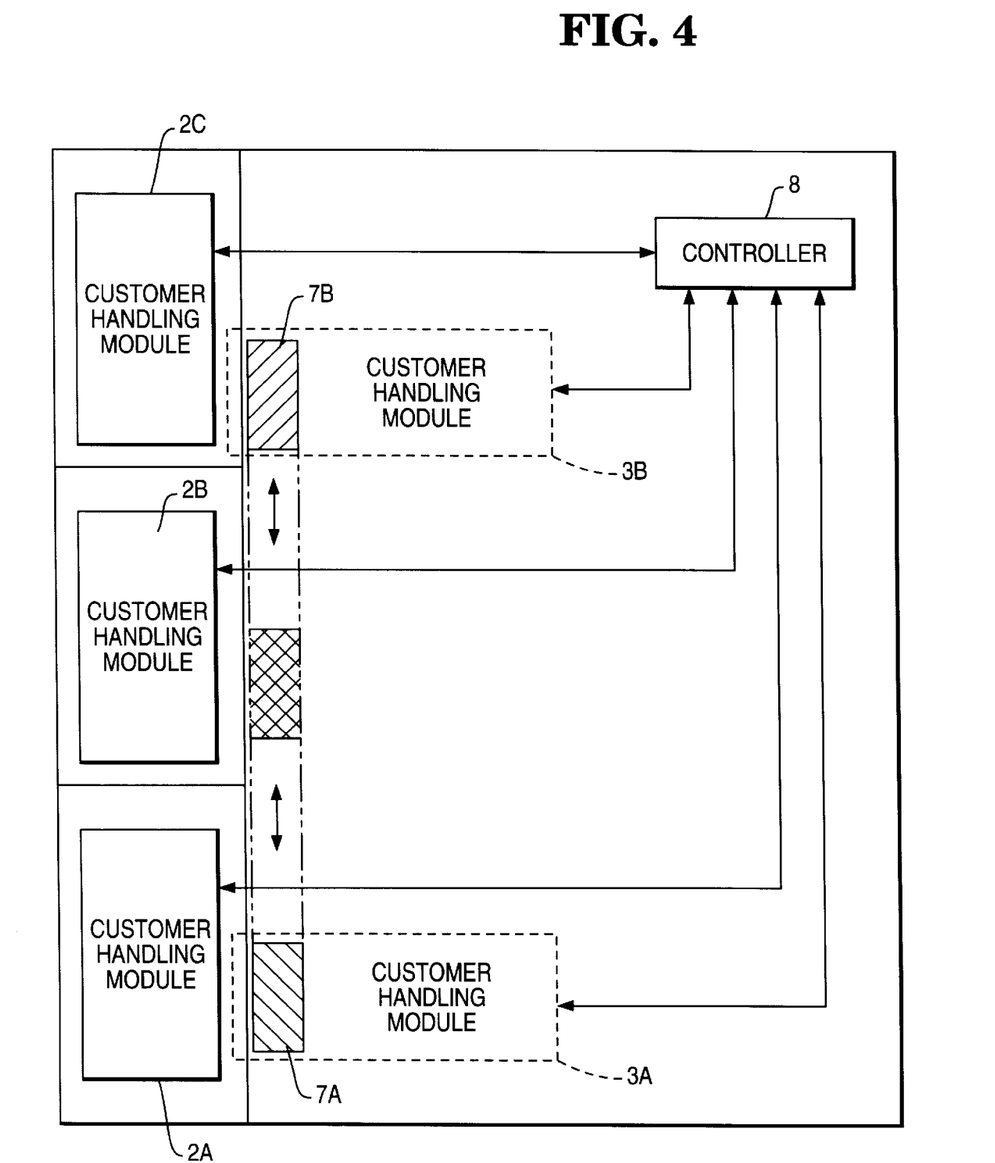
FIG. 4 is a schematic view of another preferred embodiment of an automated teller machine in accordance with the present invention, the automated teller machine having three customer operation stations and two cash handling mechanisms.

Below is a description of another preferred embodiment of an automated teller machine in accordance with the present invention which includes two cash handling mechanisms addressing three customer operation stations. One way of operating this preferred embodiment of automated teller machine is to have the two cash handling mechanisms shared by the three customer operation stations. An alternative way is to let only the customer operation station 2B access one of the two cash handling mechanisms on a sharing basis while having the other two customer operation stations 2A and 2C access cash handling mechanisms 3A and 3B respectively, as shown in FIG. 4. This alternative way simplifies cash handling mechanism control procedures while achieving high operation rates. In this way, the dispensing arrangement is simplified. For example, where all three customer control stations 2A, 2B and 2C share the two cash handling mechanisms 3A and 3B, it is necessary for two dispensing mechanisms 7A and 7B to move to all of the customer control stations 2A, 2B and 2C. To implement such an arrangement requires furnishing transport paths which would allow the two dispensing mechanisms 7A and 7B to move separately. This can result in a relatively complicated structure. In contrast, the arrangement shown in FIG. 4 permits dispensing mechanisms 7A and 7B to move only up to the position of customer operation station 2B which is located in the middle. Because there is no need for the two dispensing mechanisms 7A and 7B to cross their carriages when moving, they can share guide shafts 10 as shown in FIG. 3. Thus, the mechanical construction is significantly simplified.

Controller 8 determines which of the two cash handling mechanisms 3A and 3B the centrally located customer operator station 2B gains access to for currency withdrawal. Preferably, this determination is made from the viewpoint of which of the cash handling mechanisms can dispense currency more rapidly than the other at any given time. For example, suppose that customer operation station 2B in the middle has issued a currency handling request. In that case, if both cash handling mechanisms 3A and 3B are found to be operable, controller 8 checks customer operation stations 2A and 2C for their operating status. After controller 8 has verified which of customer operation stations 2A and 2C are currently inactive, the cash handling mechanism corresponding to that inactive customer operation station is assigned to the handling of currency for customer operation station 2B. If both customer operation modules 2A and 2C are currently being operated by customers, customer operation module 2B is assigned to the cash handling mechanism of which the corresponding customer operation module is predicted to finish with its input operation later than the other customer operation module.

If both cash handling mechanisms are in operation, customer operation station 2b is assigned to the cash handling mechanism that finishes with its operation first. If one of the two cash handling mechanisms is operating, customer operation station 2B is assigned to the other inactive cash handling mechanism. These assignments may be varied depending on the status of operation. Illustratively, if the current handling of currency is about to be terminated and if the input operation at the customer operation module corresponding to the inactive cash handling station is about to end, customer operation station 2B may be arranged to wait for the currently active cash handling mechanism to end its operation and to gain access to it thereafter.

Figure 5:
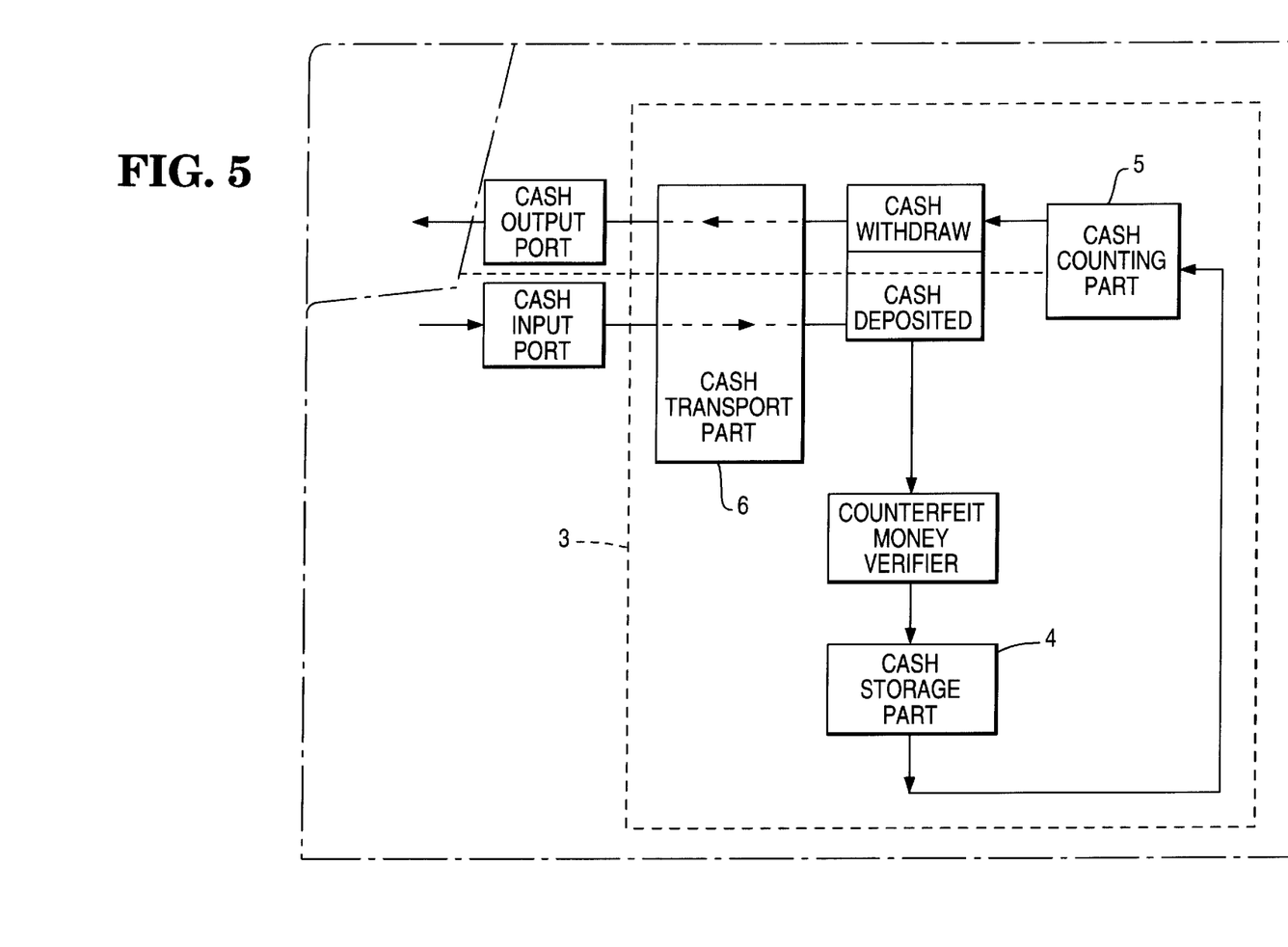
FIG. 5 is a block diagram of another preferred embodiment of an automated teller machine in accordance with the present invention, the automated teller machine being capable of allowing currency to be both withdrawn and deposited.

The process for depositing currency in accordance with a preferred embodiment of the present invention will now be described with reference to FIGS. 3 and 5. The basic operations involved are the same as those for currency withdrawal, the difference being the direction of the movement of the currency. In the description that follows, the cash input port of the customer operation station is assumed to be located under the cash output port thereof. After the customer terminates appropriate deposit operations at the customer operation station, the currency to be deposited is placed in the cash input port which is then taken inside by pick-up rollers, not shown, of the cash input port and held between rollers 14 and 16 (see FIG. 3) at a lower stage of the dispensing mechanism. The currency thus entered is then forwarded from the dispensing mechanism through currency transport path 17 to a counterfeit money verifier (see FIG. 5). When checked to be authentic by the counterfeit money verifier, the currency is then sent to currency storage portion 4. In this manner, the deposited currency is recycled for later withdrawal. Access to the cash handling stations is performed in the same manner for both withdrawal and deposit under control of controller 8.

Figure 6:
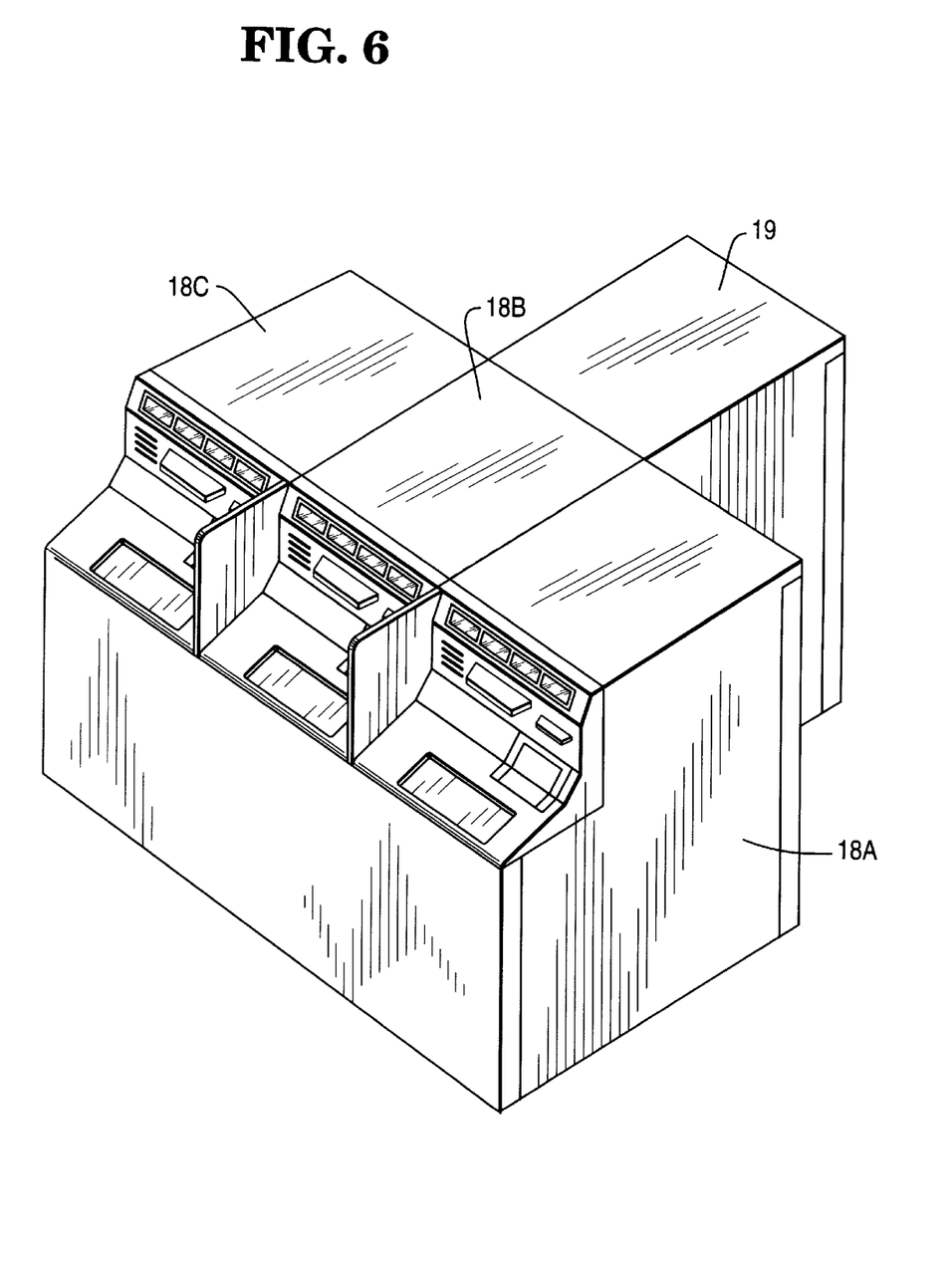
FIG. 6 is a block diagram of another preferred embodiment of an automated teller machine in accordance with the present invention, the automated teller machine having three customer operation stations and a cash handling mechanism, each of which are independently operable and connectable to form an automated teller machine unit.

While three customer operation stations are provided in conjunction with one or two cash handling mechanisms in the description of the preferred embodiments of the present invention described above, these modules may be increased or decreased in number as desired in accordance with the operating status of the environment where the automated teller machine is installed. Whereas the previously described embodiments of the present invention are each described as automated teller machines integrally including multiple customer operation stations and cash handling mechanisms, other preferred embodiments of the present invention may be composed of separate connectable customer operation stations and cash handling mechanisms each furnished as an independent and connectable unit, as shown in FIG. 6. Customer operation units 18A, 18B and 18C and cash handling unit 19 are readily combined as needed. This unit-based construction facilitates installation and the number of customer operating units and cash handling units may be optimally combined with ease in keeping with the environment where the automated teller machines are installed.

Where two or more cash handling mechanisms are provided and one of them fails during operation, the task of the failed cash handling mechanism may be taken over by the remaining operable cash handling mechanism.

In the description above, the automated teller machines in accordance with the present invention have both withdrawal and deposit functions and include a currency recycling feature. Alternatively, this currency recycling feature can be omitted to simplify the currency transport arrangement as a whole.

As described and in accordance with the present invention, the scheme of a plurality of customer operation stations sharing a fewer number of cash handling mechanisms for access thereto enhances the efficiency of the automated teller machine operation. Even if a plurality of customers operate the customer operation stations in an apparently simultaneous manner, the fact that the speed of operation varies considerably from customer to customer makes it a relatively rare occurrence for the customer operation stations to overlap exactly in timing upon access to any cash handling mechanism. Generally, the operation timing differs more or less from one customer operation station to another. Thus, there occurs little delay attributable to the overlapping currency handling requests from the multiple customer operating stations.

When a plurality of customer operation stations try to access the same cash handling mechanism simultaneously for withdrawal or for deposit, the cash handling mechanism is controlled appropriately for the highest operational efficiency as described above. This scheme provides for relatively low-cost automated teller machines without appreciably lowering the operational speed of withdrawal and deposit transactions. Furthermore, according to the present invention, the customer operation stations and cash handling mechanisms may each be furnished as separate independent and connectable units. This unit-based construction provides for a configuration in which the load on the cash handling units are optimized in the environment where the units are installed.

As described, one customer operation station may be arranged to share more than one cash handling mechanism. With such an arrangement, if any one cash handling mechanism fails, the task of the failed cash handling mechanism is taken over by one of the remaining operable cash handling mechanism.

With the preferred embodiment of an automated teller machine in accordance with the present invention having both the withdrawal and the deposit functions, the deposited currency is recycled to the cash handling mechanisms for later withdrawal. This arrangement makes it possible to replenish the dual-function automated teller machine with currency less frequently than conventional automated teller machines which service withdrawal requests only. This cash recycling feature is particularly useful in conjunction with automated teller machines in accordance with the present invention wherein the cash handling mechanisms dispense more currency than in conventional automated teller machines because the cash handling mechanisms service more than one customer operation station.

Although the present invention has been described above in detail, the same is by way of illustration and example only and is not to be taken as a limitation on the present invention. For example, the teachings of the present invention could be applied to other types of currency dispensing equipment. Accordingly, the scope and content of the present invention are to be defined only by the terms of the appended claims.

What is claimed is:

1. An automated teller machine for dispensing currency in response to customers' requests, said automated teller machine comprising:

at least three customer operation stations operable independently of one another;

at least two cash handling mechanisms wherein the number of said cash handling mechanisms is fewer in number than said customer operation stations and each of said cash handling mechanisms normally handles specific customer operation stations; and a controller for determining if one of said cash handling mechanism fails and for controlling each functional cash handling mechanism to respond to said customers' requests normally handled by said failed cash handling mechanism.

\* \* \* \* \*